(12) United States Patent
Lewis

(10) Patent No.: US 7,405,412 B2
(45) Date of Patent: Jul. 29, 2008

(54) METHOD FOR CALIBRATING A RADIATION DETECTION MEDIUM

(75) Inventor: David F Lewis, Monroe, CT (US)

(73) Assignee: ISP Investments Inc., Wilmington, DE (US)

( * ) Notice: Subject to any disclaimer, the term of this patent is extended or adjusted under 35 U.S.C. 154(b) by 162 days.

(21) Appl. No.: 11/408,234

(22) Filed: Apr. 20, 2006

(65) Prior Publication Data

US 2007/0246657 A1 Oct. 25, 2007

(51) Int. Cl.
*G01T 1/00* (2006.01)
*G01T 1/16* (2006.01)

(52) U.S. Cl. ............... 250/472.1; 250/473.1; 250/474.1

(58) Field of Classification Search ............ 250/370.07, 250/472.1, 473.1, 474.1
See application file for complete search history.

(56) References Cited

U.S. PATENT DOCUMENTS 6,675,116 B1 * 1/2004 Ritt ............................ 702/104

FOREIGN PATENT DOCUMENTS

WO WO 03021276 A1 * 3/2003

* cited by examiner

*Primary Examiner*—David P. Porta
*Assistant Examiner*—Mark R Gaworecki
(74) *Attorney, Agent, or Firm*—Thompson Hine LLC; William J. Davis

(57) ABSTRACT

A method for calibrating a radiation detection medium by exposing arbitrary locations of a radiation detection medium to a plurality of known radiation dose levels is described. One particular aspect of the method includes the steps of automatically determining the location of each arbitrary exposed location, measuring the density of each of the arbitrary exposed locations, matching each measurement for the arbitrary exposed locations with the corresponding radiation dose level thereby generating an array of paired data values for radiation dose level and measured density and calculating a calibration based on the array of paired data values.

14 Claims, 1 Drawing Sheet

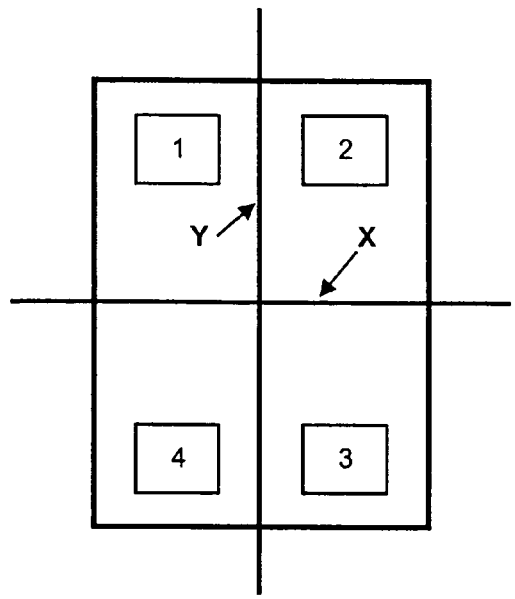
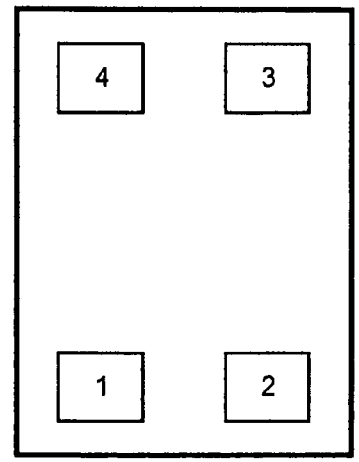
Fig. 1
Fig. 2
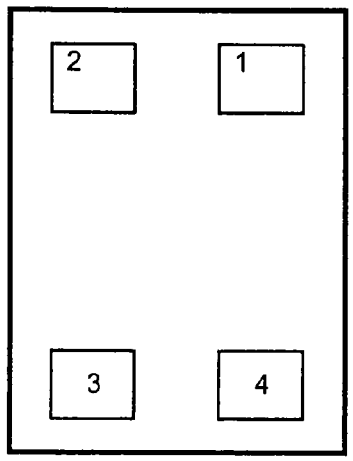
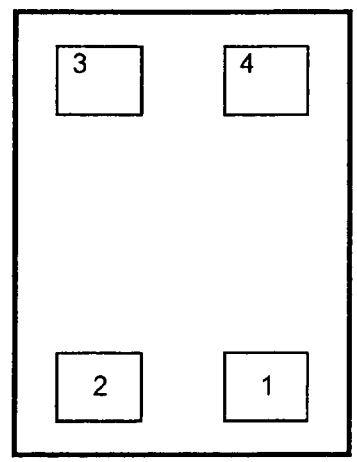
Fig. 3
Fig. 4

METHOD FOR CALIBRATING A RADIATION DETECTION MEDIUM

BACKGROUND

The present invention relates to calibration of a radiation detection medium in a radiotherapy treatment system, and in particular, to methods for calibrating a radiation detection medium in a radiotherapy treatment system wherein the calibration is determined by exposing arbitrary areas of the medium to a plurality of dose levels.

Radiotherapy has been used for years as a method for irradiating and selectively killing cancer cells while minimizing radiation exposure to adjacent tissue. The effectiveness of radiotherapy can depend upon the absorbed dose or the amount of energy deposited within a tissue mass. Absorbed dose is typically measured in centigray or cGy units.

A radiation detection medium may be used to determine the amount of radiation to which a patient is subjected during radiation treatment. Particularly useful is a two-dimensional or three-dimensional radiation detection medium that can determine radiation dose over an area or within a volume. Examples of the former are radiographic film, radiochromic film, phosphor plates, two-dimensional arrays of diodes or ion chambers, electronic portal imaging devices (EPID) and the like. An example of a volume detector is a 3-dimensional radiation sensitive gel such as "BANG" gel and the like. The radiation detection medium typically has a response that varies systematically in accordance with the degree of radiation exposure. Radiation detection media such as radiographic and radiochromic films and 3-dimensional gels typically have a light transmission or optical density that varies systematically in proportion to the radiation dose. Calibration of the radiation sensitive film or gel detection medium allows one to measure the absorbed dose indirectly by measuring the light transmission or optical density of the exposed radiation detection medium.

Calibration curves for a radiation detection medium are often prepared by exposing one or more areas of the detection medium to different and known amounts of radiation using a linear accelerator or a similar device capable of generating a range of known dose levels. Another method frequently used is to expose the detection means to a continuously varying level of doses. This can be done by interposing a wedge of material with continuously varying thickness between the radiation source and the detection medium. Alternatively, the radiation sensitive medium may be sandwiched between two blocks and positioned so that the medium is in a plane parallel to the beam when it is exposed. In this configuration the dose applied to the radiation sensitive medium decreases continuously with depth below the top surface of the blocks. This type of exposure is often referred to as a depth-dose exposure. Typically, calibration curves are generated by measuring the response of the radiation sensitive medium for numerous different dose levels. In the instance of radiation films or gels, it is common to measure the light transmission or optical density of the medium for numerous different radiation dosage levels.

In accordance with one method for calibrating a radiation detection medium described in U.S. Pat. Nos. 6,934,653 and 6,675,116 to Ritt, a radiation detection medium is divided into a number of predefined regions, each predefined region is exposed to a different selected dose and the plurality of responses in the detection medium are measured to generate a calibration. In accordance with one aspect of the described process, measurement of the plurality of responses is effected through the use of computer software to automatically obtain measurements in the predefined areas. However, there are certain drawbacks to a calibration based on exposing predefined regions of the radiation detection medium. Since the radiation detection medium is exposed in predefined regions, it is essential to accurately align and position the radiation detection medium with respect to the radiotherapy treatment system. As the radiation detection medium is placed in position by a combination of manual and visual means, it can be difficult to maintain precise registration of the film to the radiotherapy treatment system. Another source of possible error in the use of predefined areas for generating a calibration curve is related to reading and measuring of the radiation detection medium using a film scanner. In order for this to be effective and produce reliable results, the radiation detection medium must be registered in a known and reproducible location with respect to the film scanner. Accordingly, any mis-registration of the radiation detection medium with respect to either the radiotherapy treatment system or the film scanning system will typically lead to an error in measurement of the exposed areas in a system that automatically takes measurements in the predefined areas.

Yet another source of possible error in the use of predefined areas of exposure can result from mis-orientation of a radiation detection medium on a scanner. In particular, if the pre-defined areas do not form a symmetric pattern on the detection medium then the pattern of predefined areas can only be reproduced if the film is placed on the scanner in the correct orientation. This is explained with reference to FIG. 1 which depicts a radiation sensitive medium with four areas shown at 1, 2, 3 and 4 exposed to different doses of radiation. Two axes of the radiation sensitive medium are shown at X and Y. A third axis, the Z axis, not shown in FIG. 1, runs perpendicular to the X and Y axes, directly into the plane of the figure. FIGS. 2, 3 and 4 depict how the pattern of exposures appears after the radiation sensitive medium has been rotated by 180° about the X, Y and Z axes respectively. Inspection of these patterns indicates that each is unique and demonstrates that the radiation sensitive medium must be correctly oriented with respect to rotation about these axes for the pattern of exposures to appear in pre-determined locations when the radiation sensitive medium is positioned for scanning.

Accordingly, there is a need for a method of calibrating a radiation detection medium to address the foregoing issues with the prior art. More specifically, there is a need for a method capable of generating a calibration for a radiation detection medium that is not limited to making measurements in predefined areas.

SUMMARY OF THE INVENTION

In one aspect, the present invention provides a method for calibrating a radiation detection medium by exposing arbitrary locations of a radiation detection medium to a plurality of known radiation dose levels wherein each arbitrary exposed location corresponds to a known radiation dose level, automatically determining the location of each arbitrary exposed location, measuring the density of each of the arbitrary exposed locations, matching each measurement for the arbitrary exposed locations with the corresponding radiation dose level thereby generating an array of paired data values for radiation dose level and measured density and calculating a calibration based on the array of paired data values. An exposed location of a detection medium refers to a finite area or volume of the detection medium that can later be measured to quantify the effects of radiation exposure. The finite area or volume may be as small as a single measurement point, or it may encompass multiple measurement points. For example, for the purpose of scanning and measuring a radiation detection medium having an optical image, the image is usually divided into a multitude of discrete picture elements, or pixels, with a small, but finite size. Each pixel has an identifiable location with respect to the image and is associated with information that quantifies a property of the image at that location. Typically the image property that is measured is related to the optical transmittance, or optical density of the image over one or more bands of wavelengths. The size of a measurement points on the image is related to the size of a single pixel and can typically be of the order of $10^{-4}$ cm$^2$ or smaller.

In accordance with a particular embodiment of the invention the arbitrary locations of radiation exposure on the detection medium may form a reproducible spatial pattern. That is to say that the individual locations of exposure are at random positions with respect to the detection medium, but the locations of exposure are in fixed positions relative to one another. Thus, while the radiation exposure pattern, considered as a whole, is randomly placed on the detection medium, the positions of all locations of exposure forming the pattern on the detection medium could be deduced from a knowledge of the positions of a small number, e.g. three or more, of the locations of exposure. In one form, the radiation exposure pattern may be formed of a multiplicity of areas exposed to different doses of radiation in which the doses at all the locations within an area are substantially the same. In another form the pattern of radiation exposure is one in which the radiation dose changes continuously, but in a known manner from location to location.

In another aspect, the present invention provides a method for calibrating a radiographic or radiochromic radiation detection medium by irradiating the radiation detection medium with at least three different radiation dose levels, each dose level being applied to an arbitrary area on the detection medium to produce an exposed detection medium comprising arbitrarily irradiated areas, capturing an image of the exposed detection medium to form a scanned image, analyzing the scanned image to detect each of the irradiated areas on the detection medium, determining the dose level corresponding to each irradiated area and calculating the calibration for the detection medium based on the response of the scanner as a function of dose level. In accordance with particular aspects of the invention, the radiation detection medium comprises a radiochromic, self-developing film medium. In accordance with yet another aspect of the present invention, the method may further comprise confirmation that the appropriate irradiated area has been matched with the corresponding dose level by a user.

In accordance with certain aspects of the present invention, the scanned image is analyzed through the use of a software program that extracts possible candidates of the irradiated detection medium that satisfy certain criteria. The specified criteria are selected to identify those areas that are representative of an irradiated area on the detection medium which corresponds to one of the dose levels. For example, the scanned image may be analyzed to detect an area of a certain size having a specified level of uniformity. Furthermore, the software may be programmed to extract smaller portions of an imaged area to avoid potential overlap with adjacent imaged areas on the radiation detection medium.

BRIEF DESCRIPTION OF THE DRAWINGS

FIG. 1 is a diagrammatic view of a radiation sensitive medium with four areas shown at 1, 2, 3 and 4 exposed to different doses of radiation;

FIG. 2 is a diagrammatic view of the pattern of exposures of FIG. 1 after the radiation sensitive medium has been rotated by 180° about the X axis;

FIG. 3 is a diagrammatic view of the pattern of exposures of FIG. 1 after the radiation sensitive medium has been rotated by 180° about the Y axis; and FIG. 4 is a diagrammatic view of the pattern of exposures of FIG. 1 after the radiation sensitive medium has been rotated by 180° about the Z axis.

DETAILED DESCRIPTION OF THE INVENTION

The following detailed description is intended to be representative only and not limiting as to the described method for calibrating a radiation detection medium. Many variations can be devised by one skilled in this area of technology, which are included within the scope of the present invention. The following detailed discussion of the various alternative and preferred embodiments will illustrate the general principles of the invention.

For the discussion below, the following terms are defined as follows:

The term "radiation detection medium" as used herein generally refers to a medium that undergoes a detectable change when exposed to radiation. The change may be immediately visible as with radiochromic film. Alternatively the change may produce a latent image, such as in silver-based films, that requires a chemical or physical development process before it is visible. Still other radiation detection media such as diode arrays, ion chamber arrays, CR plates or EPIDs do not directly produce a visible image, but are read out electronically to yield a representation that can be viewed on a monitor or may be printed. In all cases, the radiation detection medium is capable of responding to radiation exposure over an area or a volume.

The term "radiographic film" as used herein refers to a film that forms a latent image when exposed to ionizing radiation and requires a chemical or physical development process to create a visible image.

The term "radiochromic film" as used herein generally refers to film that changes color and produces a visible image when exposed to ionizing radiation, but experiences insignificant change from exposure to visible light or other forms of non-ionizing radiation.

The term "ionizing radiation" as used herein generally refers to radiation with a level of energy that is high enough to cause atoms to lose electrons and become charged or ionized. Ionizing radiation may be in the form of a high energy particles, like an alpha or beta particles, or in the form of electromagnetic waves, like gamma rays or x-rays. High energy particles and electromagnetic waves are released from the nuclei of radioactive atoms that are decaying or may be created by causing accelerated electrons to strike a metal target.

The term "uniformity" as used herein refers to the variations in density values over a certain area. Uniformity can be measured by measuring the response of the radiation sensitive medium at a multiplicity of points to a uniform dose of radiation over an area or a volume and determining the ratio of the standard deviation ($\sigma$) of the measurement values to the mean measurement value (M). A uniformity of 5% would mean that the value of $\sigma/M$ expressed as a percentage would be 5%.

In accordance with one aspect of the present invention, arbitrary areas of a radiation detection medium are exposed to known levels of radiation. The exposed radiation sensitive medium is scanned with an optical scanner. The optical scanner responds to and measures the light transmitted by the film at discrete points to create a scanned image. In accordance with this aspect of the invention the scanned image is a map of the light transmission of the radiation detection medium. The measured response of the radiation detection medium in the scanned image is analyzed to recognize the exposed areas of the radiation, sensitive medium. The measured response is automatically associated with the corresponding radiation exposure dose and the pairs of values are plotted to provide the calibrated dose response of the radiation sensitive medium. The resulting calibration can be used to provide an indication of absorbed dose based on measurement of the exposure of the radiation sensitive medium.

In accordance with one aspect of the present invention, areas of the detection medium having a fixed geometric relationship with one another are exposed to a plurality of doses. This is to say that the exposed areas form a geometric pattern and this pattern of exposed areas is predetermined. Notwithstanding, this invention relates to calibration of the detection medium wherein the positioning of the pattern of radiation exposures with respect to the detection medium is unpremeditated. Thus, with the provision that the detection medium is exposed to all portions of the pattern, the pattern of exposures is randomly positioned on the detection medium.

One of ordinary skill in the art is well aware of the various methods that can be used to automatically expose areas of the radiation detection medium to different dose levels. For example, multi-leaf collimators, secondary collimators or fixed-blocks of radiation attenuating material, either alone or in combination, may be used to differentially shield the areas during exposure to ionizing radiation. The differentially shielded portions of the radiation detection medium allow for variations in dose level without altering the ionizing radiation characteristics such as beam intensity, individual exposure duration, etc. In accordance with other aspects of the invention, variations in dose level may be obtained by altering the ionizing radiation characteristics, by changing the rate at which the exposure dose is applied or by changing the time of exposure or by any combination of any of the aforesaid means.

The linear accelerator or other source of ionizing radiation, in combination with a means for differentially shielding areas from exposure to radiation, produces a pattern of exposures at determinate positions in space. In accordance with this invention there is no constraint on positioning the detection medium at a known location with respect to the exposure source as is required to expose the detection medium in predetermined locations.

In accordance with this invention the linear accelerator or other source of ionizing radiation exposes a radiation detection medium to known radiation dose levels, which results in a radiation dose pattern on the radiation detection medium wherein the dose pattern is arbitrarily positioned with respect to the detection medium. Consistent with one aspect of the invention, the optical transmission of the arbitrarily exposed areas are measured and associated with the corresponding known radiation dose levels. In accordance with certain embodiments of the present invention, the radiation detection medium is scanned using an optical film scanner to produce a scanned image of the film. In accordance with particularly useful embodiments of the invention, the scanned image is analyzed through the use of a software program that takes measurements over the scanned image to identify the exposed areas of the radiation sensitive medium. Based on certain criteria, the software takes representative measurements for the exposed areas of the radiation detection medium. The measured value for each exposed area is then matched to an associated radiation exposure dose and the pairs of values are used to generate a calibration curve for the radiation detection medium.

The exposed arbitrary areas of the radiation detection medium may be measured through the use of a scanner, such as those typically used for this purpose. Representative examples of film scanners that may be used include, without limitation, Vidar VXR-16, Epson Expression 1680, Microtek 9800XL, etc. Since the software automatically recognizes the arbitrarily exposed areas of the radiation detection medium, it is not necessary to ensure that the radiation detection medium is aligned in the scanner so that the exposed areas are in predetermined regions or in predetermined locations. The automatic detection of the exposed areas of the detection medium obviates the need for alignment or orientation of the radiation detection medium with respect to the scanner.

Typically, the scanner converts the exposed radiation detection medium to an array of pixels having values representing the optical transmission at each point or location on the medium. Various methods may be employed to determine what constitutes an arbitrarily exposed area. For example, the exposed areas may be assumed to have a certain threshold density over a particular size area with a specified degree of uniformity. For example, possible candidates for exposed areas on the radiation detection medium may be those having an area greater than 2 cm×2 cm and a uniformity of plus or minus 5%. Of course, these values can vary significantly and can be easily determined by one of ordinary skill in the art for a particular radiotherapy system. Furthermore, the software may be programmed to identify and eliminate overlapping exposures of adjacent regions. For example, the radiation detection medium may be subjected to two different dose levels, each of 10 cm×10 cm in size wherein the regions overlap slightly to create a 1×1 centimeter overlap region. The operator may specify that the software should look for regions of certain uniformity in an exposed area greater than 5 cm×5 cm such that the overlap region would be ignored because it would likely fall outside the specified limits for uniformity.

Individual radiation dose levels depend on a number of factors, such as the radiation source, time of exposure, rate of exposure, distance between the source of the radiation and the radiation detection medium, etc. Commercially available linear accelerators can typically deliver about 600 cGy per minute. Since most fractionated radiotherapy requires dose levels less than about 600 cGy per fraction, individual radiation exposures are typically on the order of a few seconds to a few minutes. Calibration of the radiation detection medium in accordance with the present invention typically involves exposing the radiation detection medium to radiation dose levels that cover the range of the radiation dose levels expected to be used in the radiotherapy treatment. For example, typical radiation dose levels may fall within the range of from about 1 cGy to about 600 cGy, more particularly from about 1 cGy to about 200 cGy and in accordance with particular aspects of the invention, from about 1 cGy to about 100 cGy.

The radiation detection medium can be any material or device that will respond in a repeatable and consistent way to radiation exposure. Specific examples of radiation detection media include, without limitation, radiographic film, 3-D BANG or BANANA gels, amorphous silicone arrays, electron portal imaging devices, and the like.

One embodiment of the present invention provides a method for calibrating a radiation detection medium wherein the radiation detection medium is a radiographic or radiochromic film. In accordance with particular embodiments, a radiochromic film is used. GAFCHROMIC® radiochromic films manufactured by International Specialty Products are particularly useful. Specific examples of radiochromic films suitable for use in the present invention include, but are not limited to, those disclosed in U. S. Patent Application Publication 2003/0129759 to Lewis et al., published Jul. 10, 2003, which is incorporated herein in its entirety.

Although the present invention is not limited to a particular type of radiation detection medium, the following description relates to an embodiment of the invention based on the use of a particularly useful type of film. GAFCHROMIC® radiochromic film is self developing, not significantly sensitive to normal room light, and can be cut to a desired size. Exposure to ionizing radiation causes the radiochromic film to immediately change color, typically becoming darker. The degree of darkening is proportional to exposure and can be quantitatively measured with a densitometer or scanner.

The active component in the GAFCHROMIC® film media is a micro-particulate, radiation sensitive monomer that is dispersed in a gelatin matrix and coated onto a polyester film base. When the active monomeric component is exposed to ionizing radiation, a polymerization reaction is initiated, resulting in the production of a dye polymer. Since the polymer is by nature, a dye, the exposure produces coloration within the film. The active ingredient in accordance with particular embodiments comprises a long chain fatty acid belonging to a class of molecules known as diacetylenes. Many members of the diacetylene family are characteristically radiation sensitive only when there is intermolecular order, as, for instance, in a crystalline or micellar state. Suitable acetylenic compounds have the structure A-$(CH_2)_n$—C≡C—C≡C—$(CH_2)_m$—B, where n and m are both independently an integer of from about 0 to 20, more particularly from about 6 to 14, and A and B are independently a methyl group, a carboxyl group or metal carboxylate group. When exposed to radiation, active diacetylenes undergo a solid-state polymerization reaction producing a dye polymer referred to as a polydiacetylene. The color and spectral absorbance of polydiacetylene is specific to the particular molecular structure, but preferably the color change is clearly visible on the radiation sensitive film. The color change is frequently cyan blue, purple or magenta.

Specific examples of such polyacetylenes include, but are not limited to, pentacosa-10,12-diynoic acid; 13,15-octacosadiyne and docosa-10,12-diyne-1,22-dioic acid. Of these, pentacosa-10,12-diynoic acid is particularly useful since it provides unusually high sensitivity to ionizing radiation exposure. It is to be understood however, that dispersions of other normally crystalline, color developing polyacetylenes having a conjugated structure can be employed alone or in admixture with the preferred diynes as the image receptive layers of the present invention. Such compounds include the diynes of the above structure wherein the A and/or B moieties, in addition to lower alkyl or carboxyl, can also be hydroxy, amido, lower alkyl substituted amido, an aliphatic or aromatic carboxylate ester group having up to 10 carbon atoms, a mono- or di-valent carboxylate metal salt group, halo, carbamyl, lower alkyl substituted carbamyl or tosyl, as well as the corresponding triyne and tetrayne products of the above polyacetylenes having from about 20 to 60 carbon atoms and a conjugated structure. Examples of these compounds include 10,12-docosadiynediol, the ditoluene-p-sulfonate of 9,11-eicosadiynoic acid, the monoethyl ester of 10,12-docosadiynedioic acid, the lithium, sodium or potassium salt of 10,12-pentacosadiynoic acid, the zinc salt of heneicosa-10,12-diynoic acid, the manganese salt of eicosa-5,7-diynoic acid, 10,12-docosadiyne chloride, 10,12-pentacosadiyne (m-tolyl-urethane), 10,12-pentacosadiyne {[(butoxyl-carbonyl)-methyl]uret-hane}, N-(dimethyl)-10,12-pentacosadiynamide, N,N'-bis(a 1-methylbenzy-1) 10,12-pentacosadiyndiamide and the like. In addition, the diacetylenes for use in accordance with the invention generally may also have the formula:

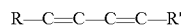

wherein R and R' are, for example, both $CH_2$—O—CON—H—$(CH_2)_5CH_3$. Such diacetylenes polymerize in the solid state either upon thermal annealing or exposure to high energy radiation. Suitable compounds are described in U.S. Pat. Nos. 5,420,000, 4,970,137, and 4,734,355, the contents of each of which are incorporated herein by reference. Preferably, the polyacetylenic compound has at least two conjugated acetylenic linkages and contains from about 10 to 60 carbon atoms.

Suitable compounds, which selectively absorb incident low energy photon radiation, are the metal halides and combinations thereof of Group I of the Periodic Table. Particularly useful are Group I metal chlorides, bromides and iodides. These compounds may be added in an amount effective to selectively absorb the incident low energy photon radiation, and generally in an amount of from about 0.1% to 50.0%, and more particularly from about 2.5% to 20% by weight of the dispersion of the coating as described hereinafter.

In accordance with some aspects of the invention, such halides are selected from the group consisting of cesium and rubidium halides and in particular, cesium chloride, cesium bromide, cesium iodide and combinations thereof.

In addition, it is possible to add an additional compound, which may be a metal ion chelating agent or sequestering agent. The chelating agent can be added in amounts of from about 0.01% to 10.0%, and more particularly from about 0.1% to 2% by weight, based on the weight of the diacetylene compound. Typical chelating agents include disodium ethylenediaminetetraacetate, sodium oxalate, citric acid, sodium citrate, sodium tartrate, sodium polyphosphate, potassium hypophosphate, sodium diethyldithiocarbamate, the sodium salt of N,N,N',N'-ethylenediaminetetra(methylenephosphonic acid), the sodium salt of 1-hydroxyethane-1,1-diphosphonic acid and combinations thereof.

An opacifying agent may also be added to the radiochromic composition. Usually such an agent is a water insoluble metal compound wherein the metal component has an atomic number greater than 18. Examples of suitable compounds include oxides, carbonates, sulfates, sulfites, sulfides, carboxylates, phosphates, phosphates and silicates. An antioxidizing agent may also be added to the composition, usually in an amount of from about 0.01% to 5%, and more particularly from about 0.1 to 1% by weight of the weight of the diacetylene component. Suitable antioxidizing agents include propyl gallate, Tenox® 6 (Tenox® is a trademark of the Eastman Chemical Company), Tenox® 2, Tenox® 7, Tenox® 20, sodium diethyldithiocarbamate, citric acid, sodium citrate, ascorbic acid, alkali metal sulfides and sulfites, 3-tert-butyl-4-hydroxy-5-methyl-phenyl sulfide, butylated hydroxytoluene, butylated hydroxyanisole, tert-butylhydroquinone, hydroxylamine and hydroxylamine hydrochloride.

The acetylenic component may also be sandwiched between two substrates in which one or both of the substrates may have the capability to filter or absorb light in the UV and/or visible wavelength regions. At least one of the substrates should be transparent in at least part of the visible spectrum.

Particularly useful as substrates are thin, flexible films made from materials such as polyethylene teraphthalate, polyethylene, polypropylene, cellulose acetate and the like.

In accordance with a particular method for preparing a radiochromic film useful herein, the polyacetylenic compound is dispersed in a non-solvating liquid and may be ripened or aged to maximize its radiation sensitivity. This dispersion may also contain a dissolved polymeric binder. Examples of binders include, but are not limited to, gelatin, agar, xanthan gum and polymers and copolymers containing maleic acid or acrylic acid residues, or salts thereof. The liquid dispersion is then applied onto the surface of a film, e.g., a polyester or similar film, and the coating is then dried. In particular, the normally crystalline or molecularly ordered polyacetylenic compound is dispersed into the non-solvating liquid in a concentration of from about 2 to 50% based on the combined weights of the polyacetylenic compound, the non-solvating liquid and the polymeric binder dissolved therein. The dispersion may then be aged or ripened by either (a) storing the composition at a temperature of from about 0 degrees C. to about 12 deg. C. for a period of from about 1 to 30 days, or (b) freezing the dispersion at a temperature between about −78 deg. C. and about −1 deg. C. for a period of time from about 1 to about 75 hours, or (c) heating the dispersion to a temperature between about 40 deg. C. and about 100 deg. C. for a period of time between about 10 minutes and 24 hours, or (d) a combination of any of the above techniques. This aging or ripening step is to be completed before drying the dispersion on the substrate.

In accordance with one aspect of the present invention, after the aging or ripening of the dispersion, a compound which selectively absorbs incident low energy photon radiation is mixed therewith in an amount which is effective to absorb incident low energy photon radiation when the dried composition is exposed thereto.

The thus mixed composition is then applied as a layer onto a substrate or support layer. Examples of substrates or supports that may be used include, but are not limited to, polymeric, metallic, glass, silicon and gallium arsenide. In accordance with a particular embodiment of the invention, the substrate or support layer may be a polymeric film which is permeable to low energy x-rays. The thus coated substrate is then dried at a temperature from about ambient up to about 100 deg. C. but below the distortion temperature of the substrate and below the decomposition temperature of any of the components of the coating or the melting point of the polyacetylene compound therein. The drying operation is generally conducted over a period of from about 20 seconds to about 10 hours and is typically effected at 15 deg. to 60 deg. C. for a period of from about 1 minute to about 5 hours.

The film thus formed is sensitive to radiation and, upon irradiation, a polymerization process is initiated in the polyacetylenic compound resulting in an immediate change in the color of the coating. The color darkens in proportion to the radiation exposure. The degree of darkening may be measured with a number of instruments including densitometers, spectrophotometers and film scanners. Generally when making such measurements, the color change of a transparent film sample would be assessed by measuring the proportion of light transmitted through the sample. Similarly, film coated on an opaque film base would be appropriately examined by measuring the proportion of light reflected from the sample.

Since the film darkens in proportion to radiation exposure, it is possible to measure the darkening and use this measurement as a means for determining the amount of the radiation exposure based on the calibration determined as described herein. Thus, the film may be employed as a radiation dosimeter, to measure and map radiation fields. Alternatively, the film may be used to record visual images such as those produced by radiographs, or autoradiographs.

The radiation may be any type of ionizing radiation. Preferably the ionizing radiation takes the form of alpha particles, beta particles, x-rays, Gamma rays, short wavelength UV, neutrons or charged particle radiation. These particles or rays may be formed by decaying radioactive atoms, or by accelerated electrons or other charged particles striking a metal target or causing a discharge in a volume of gas. In one embodiment of the present invention the radiation is gamma radiation produced by iridium, preferably iridium-192. In another embodiment of the present invention the radiation is x-ray radiation. X-rays are produced when electrons collide with the atoms and nuclei of a metal target.

It would be possible to use any radiographic and radiochromic films used to measure or record exposure to radiation in developing a calibration as described herein. However, conventional radiographic films present at least four substantial difficulties that are not applicable to the use of radiochromic film. Firstly, radiographic films are light sensitive. This would complicate the calibration procedure. Secondly, radiographic films may be extremely sensitive to small levels of contaminants that could desensitize the active layer or cause objectionable levels of fog. Thirdly, radiographic films are chemically processed to develop the image. The chemical solutions are caustic and may react adversely with the printing inks. Fourthly, the radiographic films have an energy-dependent response radiation. Since the energy spectra of radiation sources employed in radiotherapy may vary substantially with the depth of penetration in the patient and the size of the patient this can lead to uncertainties in dose measurements made with radiographic films.

The following, non-limiting examples illustrates particular aspects of the present invention.

In accordance with this prophetic example, the user would designate seven dose levels, e.g., 25, 50, 75, 100, 100, 100 and 150 cGy. Arbitrary areas of a radiochromic film would be exposed to a randomly placed pattern of the seven dose levels. The exposed medium would be scanned and the scanned image would be analyzed using a software program that extracts possible candidates meeting specified criteria. The software assumes that the highest dose corresponds to the candidate region with the highest density and the lowest dose corresponds to the candidate with the lowest density. For example, the software would assign the lowest density to the 25 cGy dose level, the second lowest level to the 50 cGy level and so on. For the fifth and sixth dose levels, the software would assign the fifth and sixth lowest density levels to the 100 cGy dose levels in random fashion. Finally, the highest density would be assigned to the 150 cGy dose level. The user may be prompted by the software to verify that the automated matching is accurate to avoid any possible error of mis-identification. The corresponding data pairs of density and dose level would then be used to generate a calibration curve for the radiation detection medium.

The calibration curve may be generated by relating the radiation dose applied to the film to the measured scanner response. The relationship could be a direct one, where the input image for the software is the raw signal measure of the light transmitted through that region (as with a film scanner) or it could also be preprocessed by applying a correction table or other factor that converts the exposure level to optical density and then the corrected image becomes the input image that is used by the software.

Although the present invention is shown and described with respect to certain aspects, it is obvious that various modifications will become apparent to those skilled in the art upon reading and understanding the specification and the appended claims. The present invention includes all such improvements and modifications and is limited only by the scope of the claims.

What is claimed is:

1. A method for calibrating a radiation detection medium comprising:
   exposing arbitrary areas of a radiation detection medium to a plurality of known radiation dose levels wherein each exposed arbitrary area is in a location and corresponds to a known radiation dose level,
   scanning the exposed detection medium and automatically determining the location for each exposed arbitrary area,
   measuring each of the exposed arbitrary areas,
   matching each measurement for the exposed arbitrary areas with the corresponding radiation dose level, thereby generating an array of paired data values for radiation dose level and measured exposure, and
   calculating a calibration based on the array of paired data values.

2. The method of claim 1 wherein the exposed arbitrary areas containing the plurality of known dose levels form a spatial pattern of doses.

3. The method of claim 2 wherein the spatial pattern of dose levels is comprised of a plurality of discrete areas within each of which the dose level is substantially uniform.

4. The method of claim 3, wherein said plurality of known radiation dose levels comprises from about 3 to about 25 different dose levels.

5. The method of claim 3, wherein said known radiation dose levels fall within the range of from about 1 cGy to about 1000 cGy.

6. The method of claim 3, wherein the step of automatically determining a location for each exposed arbitrary area comprises identifying areas of a specified dimension with a uniformity of plus or minus 10%.

7. The method of claim 6, wherein said uniformity is plus or minus 5%.

8. The method of claim 2 wherein the spatial pattern of dose levels is a pattern of continuously varying dose levels.

9. The method of claim 1, wherein said radiation-sensitive medium is a radiochromic self-developing film.

10. The radiation-sensitive medium of claim 9, wherein said radiochromic self-developing film includes a substantially crystalline image receptive polyacetylenic compound having the structure:

wherein m and n are both independently an integer from 6 to 14 and A and B are independent from one another and are selected from the group consisting of methyl, carboxyl, hydroxy, amido, lower alkyl substituted amido, aliphatic or aromatic carboxylate ester group having up to 10 carbon atoms, mono- or di-valent carboxylate metal salt group, halo, carbamyl, lower alkyl substituted carbamyl or tosyl, triyn or tetrayne products of the above polyacetylenes having from 20 to 60 carbon atoms and a conjugated structure, and combinations thereof.

11. A method for calibrating a radiation detection medium comprising:
    irradiating a radiation detection medium with at least three different radiation dose levels, each dose level being applied to an arbitrary area on the detection medium to produce an exposed detection medium comprising random irradiated areas,
    capturing an image of the exposed detection medium to form a scanned image,
    analyzing the scanned image to detect each of the irradiated areas on the detection medium,
    determining the dose level corresponding to each irradiated area, and
    calculating a calibration for the detection medium based on density as a function of dose level.

12. The method of claim 11, wherein the step of analyzing the scanned image to detect each of the irradiated areas on the detection medium comprises measuring density of each of the irradiated areas.

13. The method of claim 12, wherein the irradiated areas are selected based on predetermined criteria for image size and uniformity.

14. The method of claim 11, wherein said radiation sensitive medium is a radiochromic self-developing film.

* * * * *